Jan. 13, 1959 C. K. COLE 2,868,034
LAWNMOWER HANDLE CONSTRUCTION
Filed Dec. 16, 1955 3 Sheets-Sheet 3

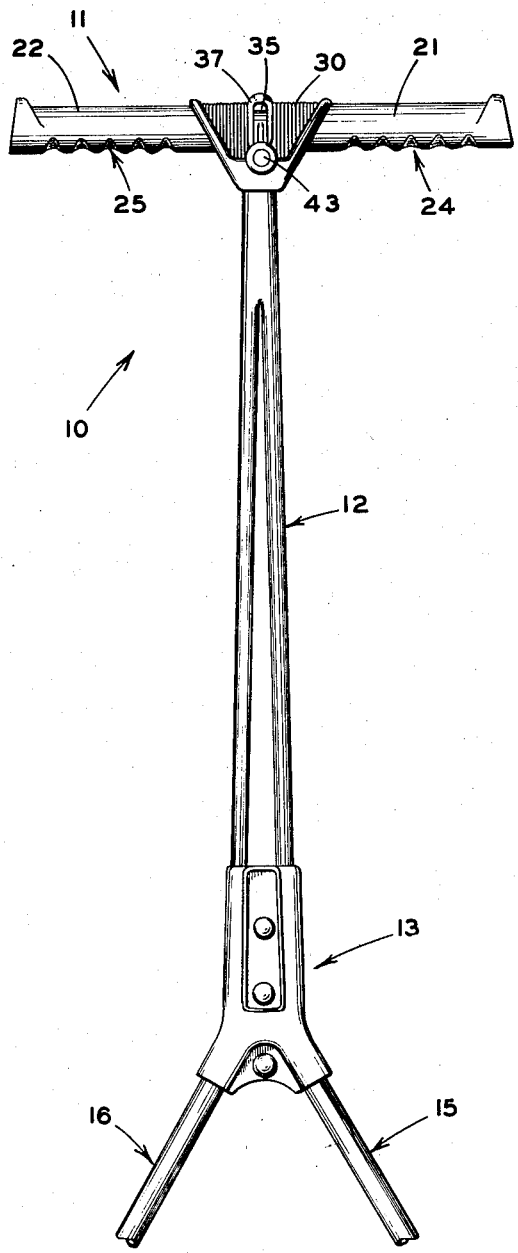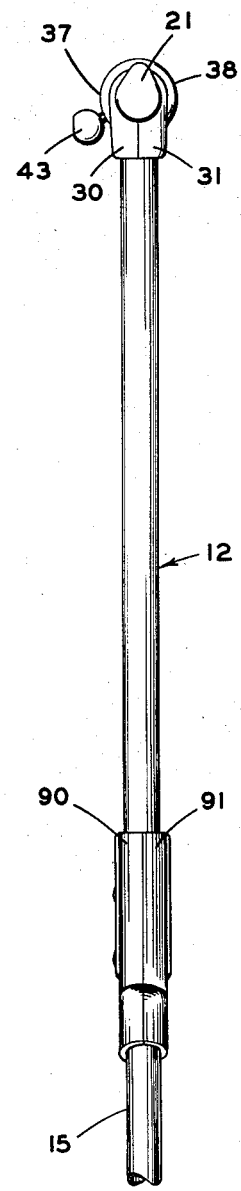
fig. 1
fig. 2
INVENTOR.
CLAYTON K. COLE

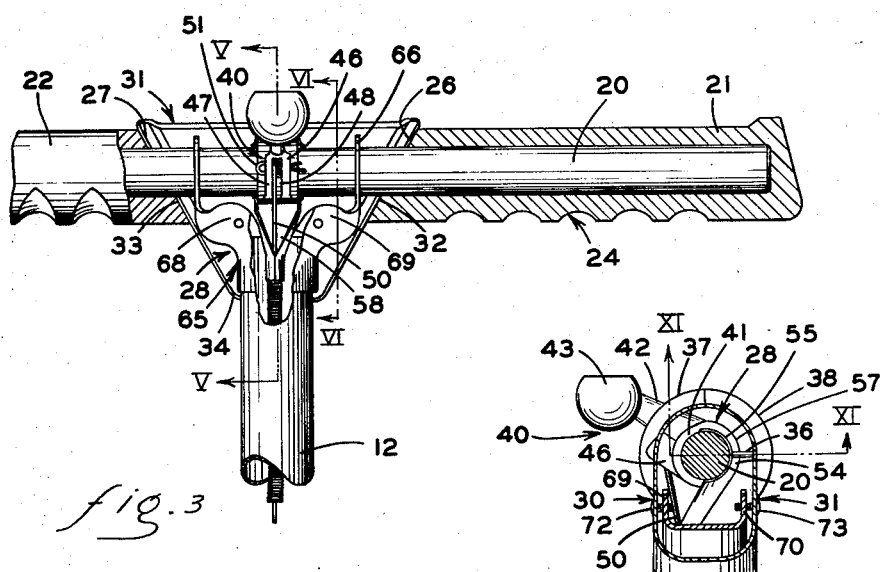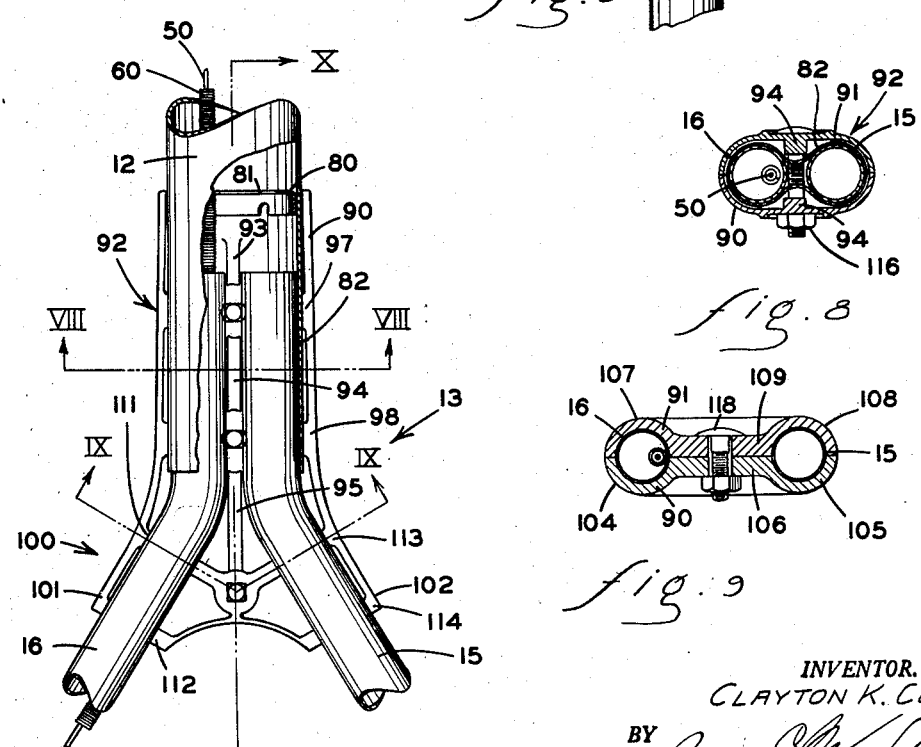

INVENTOR.
CLAYTON K. COLE
BY
ATTORNEY

United States Patent Office 2,868,034
Patented Jan. 13, 1959

2,868,034

LAWNMOWER HANDLE CONSTRUCTION

Clayton K. Cole, Kalamazoo, Mich., assignor to Atlas Press Company, Kalamazoo, Mich., a corporation of Michigan Application December 16, 1955, Serial No. 553,657

2 Claims. (Cl. 74—487)

This invention relates to an improved handle construction and, more particularly, it relates to an improved handle construction primarily adapted for use with a power lawnmower.

With power lawnmowers, such as that disclosed in copending application, Serial No. 524,969, now Patent No. 2,836,949 of which Abraham J. Oorbeck and myself are coinventers, it is frequently necessary to change the operating condition of the power source of the mower, e. g., an internal combustion engine. A control mechanism for effecting such a change preferably should be in a position where it can be actuated by the mower operator easily and without diverting his attention from the path in which the mower is moving and without lessening the degree of control that the mower operator exercises over the mower. Further, the mounting structure for such a control mechanism must be capable of easy and rapid assembly and disassembly, must provide a durable and effective arrangement for the control mechanism, and must insure substantially foolproof operation of the control mechanism in all types of use.

Mower brackets are customarily provided at the lower end of the mower handle and are formed to diverge with respect ot each other to connect between the lower end of the central, or main, shaft of the mower handle and the mounting devices at either end of the main body of the mower. These brackets are ordinarily fabricated individually and are then connected, in assembly, to the main shaft of the mower handle. With such a construction it is desirable that the mower brackets be connected directly to the main shaft so that all shocks imposed on the brackets incident to operation of the mower be transmitted directly to the shaft rather than being transmitted to the shaft through intermediate connecting means which might be broken if heavy shocks were imposed on the mower bracket.

Accordingly, it is an object of this invention to provide an improved handle construction for a lawnmower.

It is a further object of this invention to provide an improved handle construction, as aforesaid, in which a control mechanism for the power source of a power mower is provided in the hand grip portion of the handle, which can be actuated without removing the operator's hands from the mower.

It is a further object of this invention to provide an improved handle construction and control mechanism, as aforesaid, having a durable mounting structure for the control mechanism which provides for substantially foolproof operation of the control mechanism in all types of use.

It is a further object of this invention to provide a handle structure, including a power control element, whose parts are easy to fabricate, are easy to assemble, and which, when assembled, will provide a durable structure, wherein the operating parts of the power control element are enclosed within the outside casing of the handle, both for better appearance and for protection from damage during normal operation.

It is a further object of this invention to provide a handle structure which may be readily disassembled to permit easy removal of the motor control wire for repair or replacement, and which may then be readily reassembled.

It is a further object of this invention to provide a handle structure which may, with only a minor change, be adapted for equally effective use without the power control on a manually powered mower.

It is a further object of this invention to provide a handle structure having a minimum of parts which are easily formed.

It is a further object of this invention to provide a handle structure having parts which are so constructed that they can be quickly and readily disassembled for packaging in convenient sizes and readily reassembled by the ultimate customer.

It is a further object of this invention to provide an improved handle construction, as aforesaid, in which the mower brackets are directly connected to the main shaft of the handle.

It is a further object of this invention to provide an improved handle construction, as aforesaid, which presents a clean functional appearance.

It is a further object of this invention to provide an improved handle construction, as aforesaid, in which the mower brackets enter within the lower end of the tubular main shaft of the handle, and in which the cover structure enclosing the lower end of the main shaft and the handle brackets therewithin does not directly receive shocks imposed on the handle brackets.

Other objects and advantages of this invention will become apparent to those acquainted with equipment of this type upon reading the following description and inspecting the accompanying drawings.

In the drawings:

Figure 1 is a front elevation view of the lawnmower handle construction.

Figure 2 is a side elevation view of the handle construction shown in Figure 1.

Figure 3 is a front elevation view of the upper portion of the handle construction with the front cover plate removed and with the hand grips being shown in central cross section.

Figure 6 is a sectional view taken on the line VI—VI of Figure 3.

Figure 7 is a front elevation view of the lower portion of the handle construction with front cover removed and with parts thereof being partially broken away.

Figure 8 is a sectional view taken along the line VIII—VIII of Figure 7.

Figure 9 is a sectional view taken along the line IX—IX of Figure 7.

Figure 4:
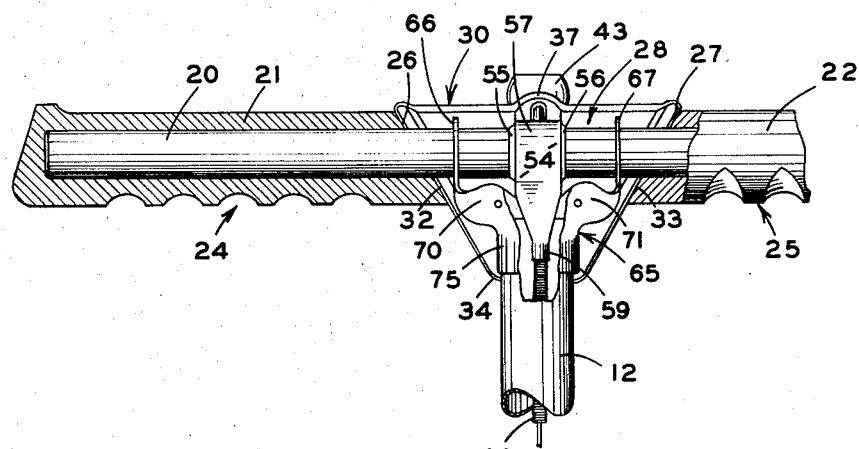
Figure 4 is a rear elevation view of the upper portion of the handle with the rear cover plate removed and with the hand grips being shown in central cross section.

In general, the lawnmower handle construction 10 includes an upper, or hand grip, portion 11, a tubular main shank 12, a lower, or fork, portion 13 and a pair of mower brackets 15 and 16 which are connectible to appropriate mounting structure on a lawnmower (not shown).

*Detailed description*

The upper, or hand grip, portion 11 of the handle construction includes an elongated handle member 20 extending laterally of the main shank 12. A pair of handle grips 21 and 22 are mounted about the ends of the handle member 20 and extend inwardly toward each other. The grips 21 and 22 are made of a suitable material, which is preferably somewhat shock resistant, such as hard rubber, and are contoured, as at 24 and 25, for comfortable gripping by the user's hands. The inward ends 26 and 27, of grips 21 and 22, respectively, converge toward each other in a downward direction.

Figure 5:
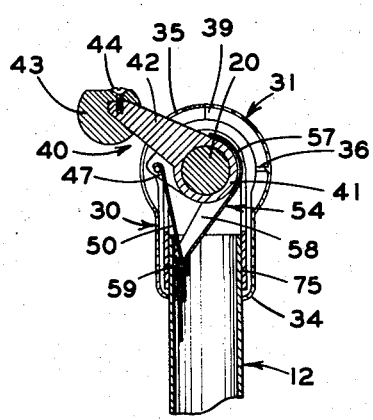
Figure 5 is a sectional view taken on the line V—V of Figure 3.

A lever 40 is mounted for rotary movement about the handle member 20. As best shown in Figure 5, the lever 40 includes an annular sleeve portion 41 surrounding and rotatably mounted on the handle member. An arm portion 42 of the sleeve extends outwardly therefrom and has a knob 43 secured on the outer end thereof by screw 44. As best shown in Figures 3 and 5, a pair of spaced ears 46 and 47 are provided on the lever 40 below the arm portion 42. The ears 46 and 47 define a groove 48 therebetween, which groove is parallel to the axis of shank 12. The ears 46 and 47 lie within the raised central portion 37 of front cover plate 30 and move therewithin in response to pivotal movement of lever 40.

A control cable 50 is secured to the lever 40 between the ears 46 and 47 for movement in response to movement of the lever. A cotter pin 51 (Figure 3) extends through openings in the ears 46 and 47 and has its free ends flared so as to be removably fixed in such mounting. An end of the cable is wrapped around that portion of cotter pin 51 that lies between the ears 46 and 47.

Figure 11:
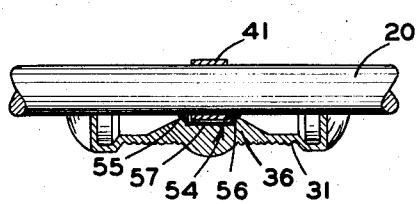
Figure 11 is a sectional view taken along the line XI—XI of Figure 6.

A cable anchor bracket 54 is mounted about the rearward portion of lever 40 and extends downwardly therefrom to act as a guide for the cable 50. The cable anchor bracket 54 includes two substantially semi-circular end flanges 55 and 56 (Figure 4) and a raised central portion 57 which lies between the end flanges 55 and 56. The end flanges 55 and 56 lie beyond but closely adjacent to the axial ends of the sleeve 41 and are in contact with handle member 20. The raised central portion 57 is opposed to, but spaced slightly from, the sleeve portion 41 of lever 40 so as to permit free movement thereof. The cable anchor bracket is held against the handle member 20 by spacing flange 36 (Figure 11), hereinafter further referred to, which flange also prevents movement of the bracket 54 axially of the handle 20. Said bracket 54, in turn, thus holds the lever 40 against movement axially of the handle 20. The edges of the bracket 54 converge toward each other below the lever 40 and handle member 20 to define a trough-shaped portion 58 (Figures 3 and 5) and further converging of the free edges causes the bracket to assume a tubular shape in the portion thereof indicated at 59.

A cable housing 60 is secured within the tubular portion 59 of the cable anchor bracket and surrounds the cable 50. The upper end of said cable housing is received within, and firmly held by, the tubular end 59 of the bracket 54.

A handle bracket 65 (Figures 3 and 4) includes a pair of annular ears 66 and 67 on either side of lever 40 through which the handle member 20 extends. The handle bracket has mounting flanges 68, 69, 70 and 71 which are adapted to receive screws, of which two are shown at 72 and 73 in Figure 6, for mounting the front and rear cover plates 30 and 31 thereon. A depending tubular shank 75 is provided on the handle bracket 65 within which is firmly received the upper end of tubular main shank 12. Said handle bracket 65 thus constitutes the load carrying element connecting the handle 20 with the shank 12.

The front and rear cover plates 30 and 31 (Figure 2), respectively, surround handle member 20. The front and rear cover plates 30 and 31 have inturned edges which define side walls 32 and 33 (Figures 3 and 4) when the cover plates are mated. Said side walls converge toward each other in a downward direction and contact the inward ends 26 and 27, respectively, of the handle grips 21 and 22. The front and rear cover plates 30 and 31 are spaced from the handle member 20 and provide a chamber 28 thereabout for reception of the lever 40, the cable anchor bracket 54, the handle bracket 65, and parts associated therewith, as described above. The converging end walls 32 and 33 extend below and surround the upper end of shank 12. The cover plates are spaced from the shank 12 except at their lower ends where they are turned inwardly and mate to define an inwardly turned flange 34 which contacts the shank 12. The front and rear cover plates are formed with aligned, raised central portions 37 and 38 (Figure 2), which mate to define an enlargement 39 (Figure 5) of chamber 28. The raised portion 37 of the front cover plate 30 is provided with an elongated slot 35 (Figures 1 and 5) whose axis is parallel to the axis of the shank 12 for purposes appearing hereinafter. The rear cover plate 31 has the spacing flange 36 above mentioned (Figures 5, 6 and 11) formed on its inner wall and extending radially inwardly toward the axis of handle member 20.

The shank 12 is tubular and the cable 50 and the cable housing 60 extend therethrough. The cross-sectional shape of the shank 12 gradually changes from a cylindrical shape at the upper end thereof to a generally ellipsoidal shape adjacent the fork portion 13.

Figure 10:
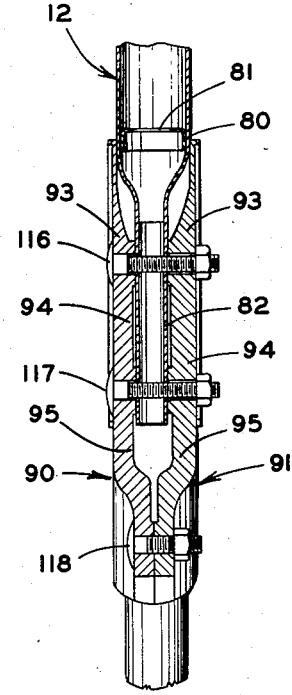
Figure 10 is a sectional view taken along the line X—X of Figure 7.

A shank spacer 80 (Figure 10) is disposed within the shank at the point where the shank enters into the fork portion 13. The shank spacer is generally ellipsoidal in shape to conform to the cross-sectional shape of the shank and is provided with a central opening 81 for passage of the control cable 50 and cable housing 60 therethrough. The portion 82 of the handle shank lying below the shank spacer 80 is flattened into snug engagement with the upper portions of the tubular handle brackets 15 and 16 (Figure 8). The handle brackets 15 and 16 (Figure 7) extend within the lower portion 82 of the tubular main shank 12 for a substantial distance and diverge from each other below the end of the shank 12. The control cable 50 and cable housing 60 extend through one of the tubular handle brackets, here bracket 16, for connection with the power source of the power lawnmower.

The fork portion 13 includes a front fork cover 90 and a rear fork cover 91, which surround the lower end 82 of shank 12 and the upper ends of handle brackets 15 and 16 to, and slightly beyond, the portions where they begin to diverge with respect to each other. The front fork cover 90 and the rear fork cover 91, both in the form of approximately an inverted Y, are mirror images of each other.

The upper portion 92 of the front and rear covers extends downwardly from a point adjacent shank spacer 80 and surrounds the lower end 82 of shank 12. The upper portion 92 (Figure 7) is generally ellipsoidal in cross-section area (Figure 8). A series of aligned, longitudinally extending flanges 93, 94, and 95 (Figures 7 and 8) are provided on the front and rear fork covers to center the lower end 82 of shank 12 and hold it firmly in proper, non-moving position therewithin. Likewise, a pair of laterally extending flanges 97 and 98 (Figure 7) are formed on each of the front and rear fork cover members to define, when the covers are assembled, a pair of interrupted annular, flanges firmly engaging the periphery of the lower end 82 of the shank 12. The flange 97 is of less depth than flange 98 and the side walls of the fork cover member taper upwardly so that at the top thereof said side walls contact the periphery of the lower portion 82 of the shank 12 directly, without the use of flanges.

The lower portions 100 of the front and rear fork covers define a pair of diverging legs 101 and 102 through which the handle brackets 15 and 16 extend, respectively. The lower portion of the front fork cover 90 includes a pair of substantially semi-cylindrical members 104 and 105 (Figure 9) joined by a connecting flange 106. The rear fork cover 91 includes a pair of substantially semi-cylindrical members 107 and 108 (Figure 9) which are joined by a connecting flange 109. The front fork cover 90 has two pairs of laterally extending flanges 111, 112, 113 and 114, each pair being mounted in one of the legs 101 and 102, respectively. Similar flanges are provided in the rear fork cover member 91, which flanges mate with the flanges previously described to provide two pairs of annular flanges, each pair firmly engaging one of the handle brackets 15 and 16 for maintaining the proper spacing thereof.

A series of bolts 116, 117 and 118 (Figure 10) extend through the front and rear fork cover and secure the covers in assembled position. Bolts 116 and 117 also help maintain the handle brackets 15 and 16 in spaced relation within the lower portion 82 of shank 12.

In use, the lever 40 may be rotated about the handle member 20. Such rotation will cause an upward or downward movement of control cable 50 within the shank 12 and the mower bracket 16. Such movement effects the desired control over the power source for the power lawnmower.

Because of the position of the upper ends of mower brackets 15 and 16 within and in snug engagement with the lower portion 82 of shank 12, any shocks imposed on the mower brackets will be transmitted directly to the shank 12. The front and rear cover plates 90 and 91 serve primarily as covers and locating means for the shank 12 and the mower brackets, and for preventing both any relative movement between said shank and brackets and any relative movement of said brackets with respect to each other. Thus, shocks applied to the mower brackets do not travel to any material extent through the plates 90 and 91 but, rather, are applied by the mower brackets directly to the shank 12. Further, the shank and mower brackets can be readily assembled and disassembled to enable the manufacturer to package and sell the mower with the hand grip portion 11 and the shank 12 disconnected from the rest of the mower, and to permit the purchaser to complete the assembly quickly and easily.

Although the above mentioned drawings and description apply to one particular, preferred embodiment of my invention, it is not my intention, implied or otherwise, to eliminate other variations or modifications which do not depart from the scope of the invention unless specifically stated to the contrary in the hereinafter appended claims.

I claim:

1. In a handle construction for a power lawnmower, the combination comprising: an elongated handle member having means providing hand grips thereon on either side of the central portion thereof; an elongated, tubular main shank; means connecting said main shank to said handle member so that the upper end of said shank is spaced from said handle member and said shank extends transversely of the longitudinal axis of said handle member from the central portion thereof, said connecting means including a handle bracket having securing means connected to said handle member adjacent the respective axial ends of the central portion thereof and a tubular bracket shank which is secured in overlapping relationship to the upper end of said main shank; a lever mounted on the central portion of said handle member between said securing means for pivotal movement about the longitudinal axis of said handle member; a cable anchor bracket secured to said handle member, said bracket including means to hold said lever in longitudinally non-moving position on said handle member and also including a cable guide means lying within the upper end of said main shank; a control cable secured to said lever and extending through said cable guide means and through said main shank and adapted to move longitudinally therewithin in response to pivotal movement of said lever.

2. The combination of claim 1 including front and rear cover members enclosing the central portion of said handle members, lever, cable anchor bracket and handle bracket, one of said cover members having a slot provided therein, said slot extending parallel with the axis of said main shank, said lever extending through said slot.

References Cited in the file of this patent

UNITED STATES PATENTS

| | | |
|---|---|---|
| 1,230,086 | Carhart | June 12, 1917 |
| 2,458,200 | Renfroe et al. | Jan. 4, 1949 |
| 2,641,889 | Bright | June 16, 1953 |
| 2,689,620 | Hainke | Sept. 21, 1954 |
| 2,740,248 | Pickens | Apr. 3, 1956 |
| 2,803,937 | Etzelt | Aug. 27, 1957 |

FOREIGN PATENTS

| | | |
|---|---|---|
| 614,353 | Great Britain | Dec. 14, 1948 |